United States Patent
Beck

(10) Patent No.: US 7,349,843 B1
(45) Date of Patent: Mar. 25, 2008

(54) AUTOMATIC CALL DISTRIBUTOR WITH LANGUAGE BASED ROUTING SYSTEM AND METHOD

(75) Inventor: Jim Beck, Orland Park, IL (US)

(73) Assignee: Rockwell Electronic Commercial Corp., Wood Dale, IL (US)

(*) Notice: Subject to any disclaimer, the term of this patent is extended or adjusted under 35 U.S.C. 154(b) by 0 days.

(21) Appl. No.: 09/484,140

(22) Filed: Jan. 18, 2000

(51) Int. Cl.
*G10L 15/00* (2006.01)

(52) U.S. Cl. .............. 704/231; 379/265.12; 379/88.05

(58) Field of Classification Search ........ 704/270–277, 704/200, 204, 231, 201; 379/265.12, 88.05
See application file for complete search history.

(56) References Cited

U.S. PATENT DOCUMENTS

| | | | |
|---|---|---|---|
| 4,937,870 A * | 6/1990 | Bossemeyer, Jr. .......... 704/241 |
| 5,367,609 A * | 11/1994 | Hopper et al. .............. 704/278 |
| 5,475,733 A * | 12/1995 | Eisdorfer et al. ............ 379/52 |
| 5,479,488 A * | 12/1995 | Lennig et al. ........... 379/88.04 |
| 5,555,179 A | 9/1996 | Koyama et al. |
| 5,594,791 A * | 1/1997 | Szlam et al. ........... 379/265.09 |
| 5,675,707 A * | 10/1997 | Gorin et al. ................ 704/257 |
| 5,703,935 A * | 12/1997 | Raissyan et al. ......... 379/88.18 |
| 5,758,322 A * | 5/1998 | Rongley ..................... 704/275 |
| 5,765,033 A | 6/1998 | Miloslavsky |
| 5,841,852 A | 11/1998 | He |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 5,999,965 A * | 12/1999 | Kelly ......................... 709/202 |
| 6,002,760 A | 12/1999 | Gisby |
| 6,021,428 A | 2/2000 | Miloslavsky |
| 6,029,124 A * | 2/2000 | Gillick et al. ............... 704/200 |
| 6,035,187 A * | 3/2000 | Franza ........................ 455/404 |
| 6,044,145 A | 3/2000 | Kelly et al. |
| 6,044,368 A | 3/2000 | Powers |
| 6,067,357 A | 5/2000 | Kishinsky et al. |
| 6,069,939 A * | 5/2000 | Fung et al. ................ 379/67.1 |
| 6,108,711 A | 8/2000 | Beck et al. |
| 6,138,139 A | 10/2000 | Beck et al. |

(Continued)

FOREIGN PATENT DOCUMENTS

DE 4228997 3/1994

(Continued)

OTHER PUBLICATIONS

*Improved Automatic Language Identification In Noisy Speech*, Fred J. Goodman, Alvin F. Martin and Robert E. Wohlford; 1989 IEEE; pp. 528, 530.

(Continued)

*Primary Examiner*—Michael Opsasnick
(74) *Attorney, Agent, or Firm*—Welsh & Katz, Ltd.

(57) ABSTRACT

A method and system for determining a language of a call handled by an automatic call distributor is disclosed. The method includes the steps of detecting the call, sampling an audio portion of the call, fitting a plurality of templates to the sampled portion of the call, and determining a language of the call based upon a best relative fit between one of the plurality of audio templates and the sampled portion of the call.

28 Claims, 1 Drawing Sheet

U.S. PATENT DOCUMENTS

| | | | |
|---|---|---|---|
| 6,167,395 | A | 12/2000 | Beck et al. |
| 6,170,011 | B1 | 1/2001 | Beck et al. |
| 6,175,563 | B1 | 1/2001 | Miloslavsky |
| 6,175,564 | B1 | 1/2001 | Miloslavsky et al. |
| 6,185,292 | B1 | 2/2001 | Miloslavsky |
| 6,229,881 | B1 * | 5/2001 | Alonso et al. ............ 379/88.01 |
| 6,243,675 | B1 * | 6/2001 | Ito ............................ 704/232 |
| 6,345,305 | B1 | 2/2002 | Beck et al. |
| 6,373,836 | B1 | 4/2002 | Deryugin et al. |
| 6,389,007 | B1 | 5/2002 | Shenkman et al. |
| 6,393,015 | B1 | 5/2002 | Shtivelman |
| 6,442,242 | B1 * | 8/2002 | McAllister et al. ........ 379/67.1 |
| 6,535,596 | B1 * | 3/2003 | Frey et al. ............. 379/201.01 |
| 6,614,885 | B2 * | 9/2003 | Polcyn .................... 379/88.02 |
| 6,732,156 | B2 | 5/2004 | Miloslavsky |
| 6,912,499 | B1 * | 6/2005 | Sabourin et al. ............ 704/243 |

FOREIGN PATENT DOCUMENTS

| | | |
|---|---|---|
| DE | 4430991 | 3/1996 |
| DE | 001119169 A2 * | 7/2001 |

OTHER PUBLICATIONS

*Robust Spoken Language Identification Using Large Vocabulary Speech Recognition*, James L. Hieronymus and Shubha Kadambe; 1997 IEEE; pp. 1111-1114.

*Language Identification With Embedded Word Models*, Padam Ramesh and David B. Roe; Speech Reearch Dept, AT&T Bell Laboratories, pp. 1887-1890.

*Language Identification Incorporating Lexical Information*, D. Matrouf, M. Adda-Decker, L.F. Lamel and J. L. Gauvain; KIMSI-CNRS; 4 pages.

Translation of DE 4228997 A1.

*Language Identification Incorporating Lexical Information*, D. Matrouf, M. Adda-Decker, L.F. Lamel and J. L. Gauvain; KIMSI-CNRS; 4 pages.; ICSLP: 1994.

Translation of DE 4228997 A1; 1994.

\* cited by examiner

AUTOMATIC CALL DISTRIBUTOR WITH LANGUAGE BASED ROUTING SYSTEM AND METHOD

FIELD OF THE INVENTION

This invention relates generally to telephony, and more particularly, to automatic call distributors.

BACKGROUND OF THE INVENTION

An automatic call distributor (ACD) is a system that facilitates the management of incoming and outgoing calls at telephone call centers. Traditionally, an ACD consisted of a specialized telephone switch for routing customer calls to available agents. The method for routing such calls is typically based on obtaining an equitable distribution of calls for each agent.

Today, like all business entities, call centers are experiencing incredible growth due to an increasingly interconnected, global and digital world. Incident to the operation of call centers is the accumulation of vast quantities of valuable information. In response to the availability of such information, owners of these call centers are demanding ACD systems with more sophisticated information management and channeling capabilities. Thus, modern ACD systems commonly incorporate various management tools including automated call identification, automated agent selection, automated call distribution, automated voice response, data integration, voice messaging, automated outbound call management, and real time displays that forecast load and analyze historical data.

Furthermore, modern ACD systems typically use improved methods for routing calls other than the traditional method based on equitable distribution. One such method is skill based routing. Skill based routing is typically based on the identity of the caller or on the number called and enables a call center to route calls to the agent most qualified to handle the customer request. When coupled, for example, with additional services such as a Dialed Number Identification Service (DNIS) that identifies a particular service number called by a customer, skill based routing can greatly increase the productivity of a call center.

While skill based methods for routing calls are commonly found in modern ACD systems, there is no known analogous development of a language based method of routing calls. However, in an increasingly global business environment, the need to identify the native language of customers is obvious. For example, when a customer answers the phone during an outdialing campaign, she may not necessarily speak the same language as the agent handling the call. Thus, regardless of any advantages that skill based routing might provide, such language barriers lead to confusion between the agent and customer which ultimately decreases productivity for the call center.

In March 1997, the U.S. Census Bureau estimated that the foreign born population of the United States was 25.8 million. This represents the largest foreign born population in United States history and an increase of 30 percent over the 1990 statistics (see Schmidley, A. Dianne and Campbell Gibson, U.S. Census Bureau, Current Population Reports, Series P23-195, Profile of the Foreign Born Population in the United States: 1997, U.S. Government Printing Office, Washington, D.C. 1999). Furthermore, marketing studies and commentaries have suggested that people feel more comfortable conducting business in their native languages (see "Spanish Language Advertising Most Effective, Even For Bilingual", Minority Markets Alert, Vol. 6, No. 12, Dec. 1, 1994; Hamlyn, Helen, "Speaking the language of your customer", Telemarketing, Vol. 11, No. 12, Jun. 1, 1993). Therefore, with the significant increase of non-English speaking households in the United States, call centers must be able to identify and service customers in their native languages in order to conduct effective business.

SUMMARY OF THE INVENTION

Accordingly, the present invention provides a method and system for determining a language of a call handled by an automatic call distributor. The method includes the steps of detecting the call, sampling an audio portion of the call, fitting a plurality of templates to the sampled portion of the call, and determining a language of the call based upon a best relative fit between one of the plurality of audio templates and the sampled portion of the call.

Similarly, the automatic call distributor system, comprises, in part, capabilities for detecting a call. Once the call is detected, the system may sample an audio portion of the call and attempt to match the audio sample to one of a plurality of audio templates that has the best relative fit. By doing so, the automatic call distributor is able to determine the language of the call and can route the call to an appropriate response service. Such response services may include, but are not limited to, human agents, voice response units (VRU), or interactive voice response (IVR) applications. If, however, the system is unable to obtain a best relative fit, it may ultimately route the call to a default agent.

One of the primary objectives of the invention is to identify the language of a customer who answers the phone during an outdialing campaign. When a customer answers the phone, they typically speak a greeting in their native language. For example, a Spanish speaking person might answer the phone by saying "BUENO". The automatic call distributor would analyze the voice pattern of this initial greeting and compare it against sample greeting patterns in different languages to determine the customer's language.

Another main objective of the invention is to route the call to a response service capable of servicing the language of the customer. Such a service might be a human agent who can speak the language or an automated voice response unit with messages recorded in the language of the customer.

The advantages of identifying and routing a call based on the language of the customer are increased efficiency and productivity at the call center and higher customer satisfaction with call center service.

Further objectives, advantages and features of the invention will become apparent from the following detailed description of preferred embodiments of the present invention when taken in conjunction with the accompanying drawings in which like reference numerals designate like elements throughout the different views.

DESCRIPTION OF THE PREFERRED EMBODIMENT

Figure 1:
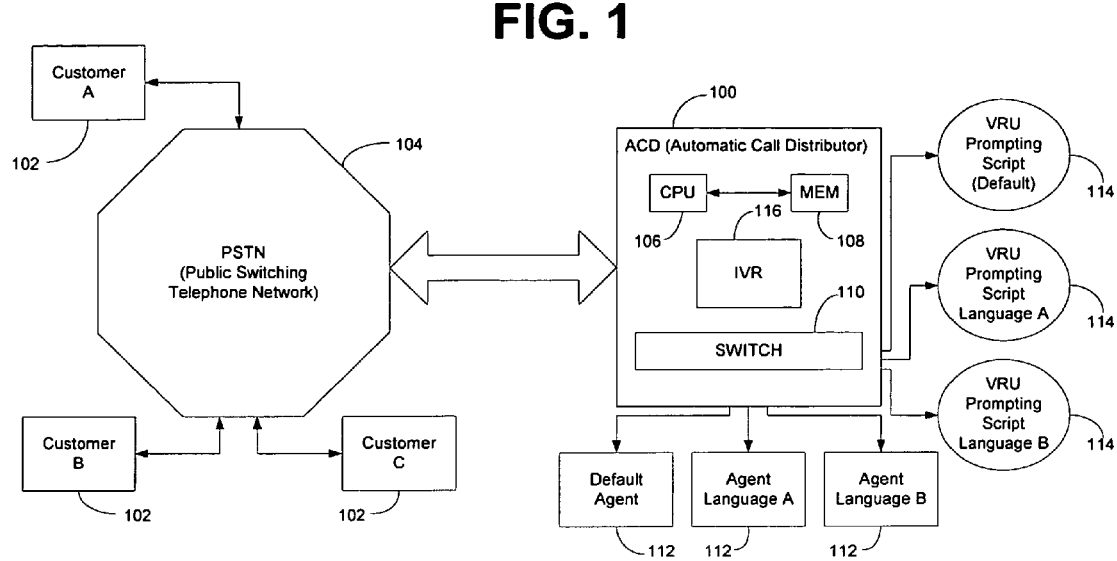
FIG. 1 is a functional block diagram of the preferred embodiment of the automatic call distributor system of the present invention coupled to an external public switching telephone network (PSTN).

Referring the drawings, FIG. 1. illustrates one preferred embodiment of an automatic call distributor (ACD) 100 with language recognition means. The ACD 100 receives inbound calls from and places outbound calls to customers 102 through an external public switching telephone network 104. The ACD 100 is controlled by a central processing unit (CPU) 106 coupled to a memory unit 108 which contains, in part, software that guides the switch 110 and contains the profile information describing, in part, the language capabilities of the human agents 112 and the voice response units (VRU) 114 that are coupled to the switch 110. The switch 110 has several ports for connection to human agents 112, VRUs 114, and to supervisory and other units (not shown). Each human agent 112 is qualified to handle customer calls in at least one particular language. The agents 112 may each have a control console (not shown) with a keyboard and video display for inputting and retrieving data in response to various types of calls. Similarly, each VRU 114 includes at least one prompting script recorded in at least one particular language to obtain information from customers who speak that language. In one preferred embodiment of the invention, each VRU 114 includes several prompting scripts recorded in several different languages so that the VRU 114 can simultaneously handle several different customer calls in several different languages. Furthermore, the ACD 100 includes an interactive voice response (IVR) unit 116 that embodies the language recognition means. Upon determining the language of a call, this IVR 116 communicates this information to the CPU 106 which then properly routes a customer call to an appropriate agent 112 or VRU 114.

Figure 2:
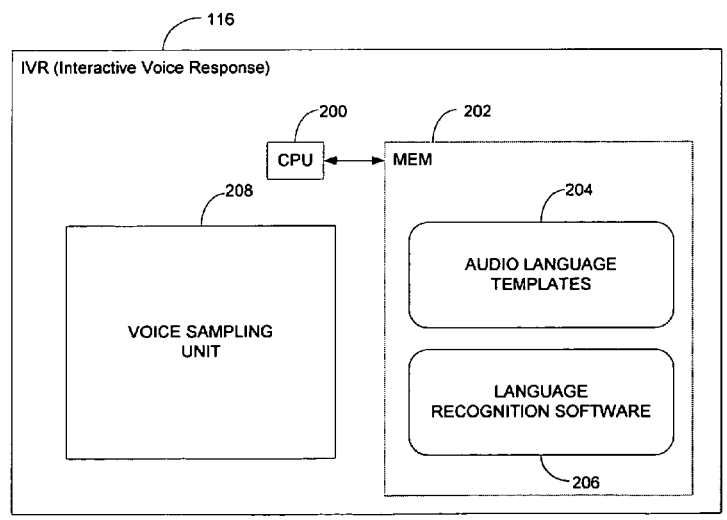
FIG. 2 is a functional block diagram of the preferred embodiment of the interactive voice response (IVR) unit within the automatic call distributor of FIG. 1.

With reference to FIG. 2, the IVR 116 of the ACD 100 in FIG. 1 is also controlled by a CPU 200 coupled to a memory unit 202 which contains in part, language recognition software 206 and a plurality of audio language templates 204. When the ACD 100 in FIG. 1 detects the completion of an outbound call, the IVR 116 immediately engages its voice sampling unit 208 which samples the greeting answer of the customer, storing it in the memory unit 202. The CPU 200 analyzes and processes the sampled greeting of the customer by comparing it against the plurality of audio language templates 204 to find a best relative fit. Once the CPU 200 identifies the language of the sampled greeting of the customer, it conveys this information to the CPU 106 of the ACD 100 in FIG. 1. Upon reception of such information, the ACD 100 in FIG. 1 switches the customer call to an agent 112 or VRU 114 to service the call in the proper language.

In an alternative embodiment of FIG. 1, the ACD 100 also extracts additional information from the external PSTN 104 when dealing with incoming customer calls. In one embodiment of the invention, such additional information might include a Dialed Number Identification Service (DNIS) to identify which of a plurality of service numbers a customer actually called, or an Automatic Number Identification (ANI) service to identify the number of the calling customer. Such additional information would be used in conjunction with certain databases in order to make an initial determination of the language of the calling customer.

For example, in one embodiment, the external PSTN provides the surname of the calling customer to the ACD. The ACD then uses a best guess method to determine the language of the caller corresponding to the surname and switches the call to an appropriate agent or VRU. In an alternative embodiment, the ACD uses the ANI number to identify a geographic location of the calling customer to determine whether there is a specific language associated with that location. For instance, in either of these embodiments, one could envision an IVR in the ACD greeting the calling customer with a salutation in the "best guessed" determined language. The ACD would then analyze the response of the calling customer to confirm that the best guessed language was indeed the proper language to use. If the CPU 200 should determine that the initial language was incorrect, the CPU 200 reconnects the call to the appropriate response service.

In another embodiment, the ACD is coupled to an internal database that stores the language used by a repeat customer. Upon obtaining the ANI number of a calling repeat customer, the ACD determines the language of the customer by accessing the database through the ANI number. In yet another embodiment of the invention, the ACD is coupled to a database, internal or external, that provides marketing information associated with the ANI number, including the language of the customer.

While a detailed description of the preferred embodiment of the invention has been given, it should be understood that implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

I claim:

1. A method used by an automatic call distributor to route an outdialed call with a customer, such method comprising the steps of:
   detecting the outdialed call with the customer of the automatic call distributor;
   sampling an initial audio portion of the call, and detecting and sampling an unprompted initial telephone answering greeting provided by the customer during the initial audio portion of the call;
   fitting a plurality of audio templates of traditional telephone answering greetings in a plurality of languages including at least "Bueno" to the sampled greeting of the call;
   determining a language of the call based upon a best relative fit between one of the plurality of audio templates and the sampled greeting of the call; and
   routing the call to a response service of the automatic call distributor based upon the determined language of the call.

2. The method of routing the call as in claim 1 wherein the step of determining further comprises identifying at least one of the customer and a geographic location associated with the customer and using the at least one of the customer and the geographic location in determining the language of the call.

3. The method of routing the call as in claim 1 wherein the step of routing further comprises selecting a voice response unit.

4. The method of routing the call as in claim 1 wherein the step of routing further comprises selecting a default response service for servicing unidentified languages.

5. The method of routing the call as in claim 1 wherein the step of routing further comprises selecting a voice response unit having a plurality of stored language scripts.

6. An apparatus within an automatic call distributor for routing outdialed calls with customers, such apparatus comprising:

means for detecting an outdialed call with a customer of the automatic call distributor;

means for sampling an initial audio portion of the call, and detecting and sampling an unprompted initial greeting provided by the customer within the initial audio portion of the call;

means for fitting a plurality of audio templates of traditional telephone answering greetings in a plurality of languages including at least "Bueno" to the sampled greeting of the call;

means for determining a language of the call based upon a best relative fit between one of the plurality of audio templates and the sampled greeting of the call; and means for routing the call to a response service of the automatic call distributor based upon the determined language of the call.

7. The automatic call distributor as in claim 6 wherein the step of determining further comprises identifying at least one of the customer and a geographic location associated with the customer and using the at least one of the customer and the geographic location in determining the language of the call.

8. The automatic call distributor as in claim 6 wherein the means for routing further comprises means for selecting a voice response unit having a plurality of stored language scripts.

9. The automatic call distributor as in claim 6 wherein the means for routing further comprises means for selecting one of a group consisting of agents and voice response units.

10. The automatic call distributor as in claim 9 wherein the means for routing further comprises means for selecting a default response service for servicing unidentified languages.

11. A method of routing an outdialed call with a customer by a automatic call distributor, such method comprising the steps of:

detecting the call with the customer of the automatic call distributor;

detecting and sampling an unprompted initial greeting provided by the customer within an initial audio portion of the call;

fitting a plurality of audio templates of traditional telephone greetings in a plurality of languages including at least "Bueno" to the sampled initial greeting of the call; and determining the language of the customer based upon a best relative fit between one of the plurality of audio templates and the sampled initial greeting provided by the customer; and routing the call to a response service of the automatic call distributor based upon the determined language of the call.

12. The method of routing the call as in claim 11 wherein the determining step further comprises:

identifying at least one of the customer and a geographic location associated with the customer; and determining the language of the call based upon a best relative fit between one of the plurality of audio templates and the sampled greeting of the call and based upon the at least one of the customer and the geographic location.

13. The method of routing the call as in claim 11 wherein the determining step further comprises identifying the customer of the automatic call distributor based upon an ANI as a repeat customer and accessing a database that stores the language of the repeat customer of the automatic call distributor.

14. An apparatus for routing an outdialed call with a customer within an automatic call distributor such apparatus, comprising:

means for detecting the outdialed call with the customer of the automatic call distributor within the automatic call distributor;

means for detecting and sampling an initial unprompted answering greeting provided by the customer within an initial audio portion of the call;

means for fitting a plurality of audio templates of traditional telephone answering greetings in a plurality of languages including at least "Bueno" to the sampled greeting of the call;

means for determining a language of the customer based upon a best relative fit between one of the plurality of audio templates and the sampled initial greeting provided by the customer; and means for routing the call to a response service of the automatic call distributor based on the determined language of the call.

15. The apparatus as in claim 14 wherein the determining means further comprises means for identifying the customer of the automatic call distributor as a repeat customer and means for accessing a database of the automatic call distributor that stores the language of the repeat customer of the automatic call distributor.

16. The apparatus as in claim 14 wherein the determining means further comprises means for basing the determination, in part, on a surname of the customer of the automatic call distributor.

17. The apparatus as in claim 14 wherein the determining means further comprises means for basing the determination, in part, on marketing information associated with the customer of the automatic call distributor.

18. The apparatus as in claim 14 wherein the determining means further comprises basing the determination, in part, on a geographic location associated with the customer of the automatic call distributor.

19. A method of routing an outdialed call with a customer handled by an automatic call distributor, such method comprising the steps of:

detecting the outdialed call with the customer of the automatic call distributor;

detecting and sampling an initial answering unprompted greeting provided by the customer within an initial audio portion of the call;

fitting a plurality of audio templates of traditional telephone greetings in a plurality of languages including at least "Bueno" to the sampled initial greeting of the call;

determining a language used by the customer based upon a best relative fit between one of the plurality of audio templates and the initial greeting provided by the customer; and routing the call to a response service of the automatic call distributor based upon the identified language of the call.

20. The method of routing the call as in claim 19 further comprising analyzing a voice pattern of the initial greeting provided by a customer of the automatic call distributor and comparing the initial greeting with sample greeting patterns provided in different languages to determine the language of the customer.

21. The method of routing the call as in claim 19 wherein the determining step further comprises basing the determining, in part, on a surname of the customer of the automatic call distributor.

22. The method of routing the call as in claim 19 wherein the determining step further comprises basing the determination, in part, on marketing information associated with the customer of the automatic call distributor.

23. The method of routing the call as in claim 19 wherein the determining step further comprises basing the determination, in part, on a geographic location associated with the customer of the automatic call distributor.

24. The method of routing the call as in claim 19 further comprising using a database to make an initial determination of the language of a called customer.

25. The method of routing the call as in claim 24 wherein the database further comprises a surname database.

26. The method of routing the call as in claim 24 wherein the database further comprises a geographic database.

27. The method of routing the call as in claim 24 wherein the database further comprises a marketing information database.

28. The method of routing the call as in claim 24 wherein the database further comprises a repeat customer database.

* * * * *